(12) United States Patent
Lee et al.

(10) Patent No.: US 6,486,239 B2
(45) Date of Patent: Nov. 26, 2002

(54) POLYESTER BASED COATING COMPOSITION FOR ANTI-STAIN PCM OUTSIDE PANEL

(75) Inventors: Joon Ho Lee, Kyeongki-do (KR); Jin Hyung Lee, Kyeongki-do (KR); Sung Uk Park, Seoul (KR); Chang Il Jin, Kyeongki-do (KR); Joo Lak Sohn, Kyeongki-do (KR)

(73) Assignee: Kumgang Korea Chemical Co., Ltd., Seoul (KR)

( * ) Notice: Subject to any disclaimer, the term of this patent is extended or adjusted under 35 U.S.C. 154(b) by 0 days.

(21) Appl. No.: 09/749,644

(22) Filed: Dec. 28, 2000

(65) Prior Publication Data
US 2001/0036985 A1 Nov. 1, 2001

(30) Foreign Application Priority Data
Dec. 31, 1999 (KR) .............................. 99-68216

(51) Int. Cl.$^7$ ............................ C08K 5/34; C08K 5/29; C08K 5/24

(52) U.S. Cl. ................ 524/100; 524/261; 524/196; 524/366; 524/418; 524/539; 524/594

(58) Field of Search .......................... 428/458; 524/100, 524/261, 196, 366, 418, 539, 599

(56) References Cited

U.S. PATENT DOCUMENTS

| 5,130,402 A | 7/1992 | Akiyama et al. | 528/45 |
| 6,180,703 B1 | 1/2001 | Onoi et al. | 524/265 |

*Primary Examiner*—Kriellion A. Sanders
(74) *Attorney, Agent, or Firm*—Lowe Hauptman Gilman & Berner, LLP

(57) ABSTRACT

This invention relates to a polyester based coating composition for anti-stain PCM outside panel and more particularly, to the polyester based coating composition for anti-stain PCM outside panel having the excellent combination of physical properties such as surface compactness, anti-contamination effect, acid resistance and self-cleaning effect, wherein the polyester based coating composition comprises:

a) hydroxy unsaturated polyester resin and a melamine curing agent as main ingredients, b) sulfonic acid blocked with a secondary amine or epoxy resin, c) sulfonic acid blocked with a tertiary amine, d) an isocyanate compound blocked with malonate, e) a tin based curing catalyst, f) polyalkyl silicate, and g) an alkoxy compound; further, the polyester based coating composition for anti-stain PCM outside panel can demonstrate excellent properties of a film of paint such as appearance and workability even without the addition of any defoaming agent and leveling agent by adjusting the compatibility of both hydroxy unsaturated polyester resin and polyalkyl silicate.

7 Claims, No Drawings

POLYESTER BASED COATING COMPOSITION FOR ANTI-STAIN PCM OUTSIDE PANEL

BACKGROUND OF THE INVENTION

1. Field of the Invention

This invention relates to a polyester based coating composition for anti-stain PCM outside panel and more particularly, to the polyester based coating composition for anti-stain PCM outside panel having an excellent combination of physical properties such as surface compactness, anti-contamination effect, acid resistance and self-cleaning effect, wherein the polyester based coating composition comprises:

a) hydroxyl unsaturated polyester resin and a melamine curing agent as main ingredients, b) sulfonic acid blocked with a secondary amine or epoxy resin, c) sulfonic acid blocked with a tertiary amine, d) an isocyanate compound blocked with malonate, e) a tin based curing catalyst, f) polyalkyl silicate, and g) an alkoxy compound; further, the polyester based coating composition for anti-stain PCM outside panel can demonstrate other excellent properties such as appearance and workability even without addition of any defoaming agent and leveling agent by adjusting the compatibility of both hydroxy unsaturated polyester resin and polyalkyl silicate.

2. Background of the Invention

Recently, environment-related multifunctional technologies have been spotlighted and in parallel with this trend, there is an increasing demand for electronic products using a pre-coated metal (PCM) technology in the related field, together with the growing interest in special in- and out-door contamination. In particular, there is a rapidly increasing demand for anti-contaminating paints to preserve the brilliant view of city in the PCM paint field of building materials.

In view of the structural form, the currently used outside panel for building are divided into high quality product for use in a high-story building and low quality product for use in a low-story building. As far as the high-story buildings are concerned, paint based on containing fluorine resin with high weatherability has been mainly employed for long term durability of buildings, while maintaining the appearance of building through periodic washing. On the other hand, the low-story buildings have maintained little cleanliness due to initially established low durability, and their outside panel during architecture has been made using a color steel plate coated by a film of paint containing polyester melamine resin with low durability. Among other things, the first priority should be placed on the maintenance of the initial building appearance, while sustaining the durability and anti-contamination effect of the film of paint. There is an urgent need for film the high degree of property self-cleaning of paint to be naturally washed by rainwater, even though an architectural PCM steel panel is contaminated.

To achieve the aforementioned object, the inventor filed a patent invention relating to a self-cleaning PCM steel plate (Korea Unexamined Patent No. 2000-47283). During the actual application, however, the self-cleaning PCM steel plate has shown some disadvantages in that (1) in spite of some self-cleaning effect, the panel could not be maintained for more than two years, (2) an excessive amount of melamine cross-linking resin for the improvement of cross-link density in the film of paint has resulted in significant changes in physical properties during the coating process, and when the coated plate collided with other iron steel, black scratch traces such as metal mark were present at the surface of the film of paint, thus being a cause of client s complaint.

To effectively prevent from the contamination of rainwater in the film of paint, the U.S. Pat. No. 6,013,721 has disclosed a coating composition comprising a partial hydrolyzed condensate, wherein tetramethoxy silane is hydrolyzed less than 100% and condensed; hence, the partial hydrolyzed condensate contains less than 1/10 of the molar ratio of silanol group and methoxysilyl group ([SiOH]/[SiOMe]), 0 to 30 wt. % of 2~8 monomers and tetramethoxy silane having the molecular weight of 1,500 to 5,000.

In general, in the case of a paint containing a silicate compound with silanol group, an easier infiltration of water-soluble oxidants into a hydrophilic metal substrate has resulted in lowering the chemical resistance with poor storage stability via rapid reaction between a hydroxy group and a silanol group (SiOH) within resin, and magic contamination.

SUMMARY OF THE INVENTION

To free from the aforementioned shortcomings, therefore, an object of this invention is to provide a polyester based coating composition for anti-stain PCM outside panel having an excellent combination of physical properties such as surface compactness, anti-contamination, acid resistance and self cleaning capacity, wherein the polyester based coating composition comprises:

a) hydroxy unsaturated polyester resin and a melamine curing agent as main ingredients, b) sulfonic acid blocked with a secondary amine or epoxy resin, c) sulfonic acid d blocked with a tertiary amine, d) an isocyanate compound blocked with malonate, e) a tin based curing catalyst, f) polyalkyl silicate, and g) an alkoxy compound.

Further, this coating composition for anti-stain PCM outside panel demonstrate excellent appearance and workability even without the addition of any defoaming agent and leveling agent by adjusting the molecular weight ranges of both hydroxy unsaturated polyester resin and polyalkyl silicate.

DETAILED DESCRIPTION OF PREFERRED EMBODIMENTS

This invention is characterized by a polyester based coating composition for anti-stain PCM outside panel comprising a hydroxy unsaturated polyester resin, a melamine curing agent, a curing accelerator, a supplemental curing agent, a supplemental curing accelerator, a storage stabilizer and a curing catalyst, wherein said polyester based coating composition further comprises:

a) 40 to 80 wt. % of the hydroxy unsaturated polyester resin;

b) 5 to 50 wt. % of the melamine curing agent;

c) 0.5 to 3 wt. % of sulfonic acid blocked with a secondary amine or epoxy resin;

d) 0.001 to 3 wt. % of sulfonic acid blocked with a tertiary amine;

e) 1 to 10 wt. % of an isocyanate compound blocked with malonate;

f) 0.1 to 2 wt. % of a tin based curing catalyst, f) 0.5 to 10 wt. % of polyalkyl silicate expressed by the following formula; and g) 1 to 5 wt. % of an alkoxy compound,

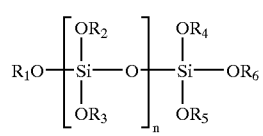

(1)

wherein $R_1$, $R_2$, $R_3$, $R_4$, $R_5$ and $R_6$ are independently alkyl groups of $C_{1-5}$; and n is an integer of 5 to 80.

This invention is explained in more detail as follows.

This invention relates to a polyester based coating composition for anti-stain PCM outside panel which can improve significantly the durability of a film of paint with strong resistance against outer contaminants, wherein it comprises a hydroxy unsaturated polyester resin and a melamine curing agent as main ingredients, sulfonic acid blocked with a secondary amine or epoxy resin as a curing accelerator, sulfonic acid blocked with a tertiary amine as a supplemental curing accelerator, an isocyanate compound blocked with malonate as a supplemental curing agent, a tin based curing catalyst, polyalkyl silicate as a surface modifier expressed by the formula 1, and an alkoxy compound as a storage stabilizer.

This invention is explained in more detail about each chemical composition contained in the coating composition.

The hydroxy unsaturated polyester resin according to this invention refers to polyester based resin with hydroxy group; unsaturated polyester, oil-modified polyester and their modified resins such as urethane-modified unsaturated polyester or urethane-modified/oil-modified polyester. It is preferred that the hydroxy unsaturated polyester resin according to this invention is selected from the material with a number average molecular weight of 1,500 to 8,000, a glass transition temperature of −15 to 60 and OH value of 15 to 180, more preferably with a number average molecular weight of 2,000 to 7,000, a glass transition temperature of −5 to 45 and OH value of 20 to 150.

The oil-modified polyester of this invention can be prepared via a reaction between a polybasic acid and a polyol. The examples of polybasic acid include aliphatic acid, phthalic anhydride, isophthalic acid, terephthalic acid, succinic acid, adipic acid, maleic anhydride, tetrahydrophthalic anhydride, hexahydrophthalic anhydride and their derivatives. Since an excess use of compounds with double bond such as isophthalic acid may result in deteriorating the weatherability of a film of paint, it is preferred to select linear-structure acids without benzene ring, for example, aliphatic acids. Further, the examples of polyol include ethylene glycol, propyrene glycol, diethylene golycol, butane diol, neopentyl glycol, 3-methylene diol, 1,4-hexane diol and 1,6-hexane diol.

The urethane-modified polyester resin can be prepared via a reaction between oil-modified polyester resin and polyisocyanate compound. The examples of the polyisocyanate compound include hexamethylene diisocyanate, isophorone diisocyanate, xylene diisocyanate, toluene diisocyanate, 4,4-diphenylmethane diisocyanate, 4,4-methylene bis (cyclohexyl isocyanate), 2,4,6-triisocyanate toluene and their derivatives.

According to this invention, it is preferred that 40 to 80 wt. % of the hydroxy unsaturated polyester resin is contained to the total coating composition. If the content is less than 40 wt. %, the flexibility and impact resistance of a film of paint may be severely affected. In contrast, in case of exceeding 80 wt. %, various properties such as anti-contamination, solvent resistance and hardness may be drastically reduced.

According to this invention, melamine resin is employed as a curing agent. The example of melamine resin includes methoxy melamine resin or a mixed form of methoxy/butoxy melamine resin with the molecular weight of 300 to 1000. The methoxy melamine resin can be prepared via a polymerization between methanol and formaldehyde. The examples of currently commercialized melamine resin according to this invention include CYMEL-303, CYMEL-325, CYMEL-327, CYMEL-350 and CYMEL-370 (CYTEC Co.); RESIMINE-7550, RESIMINE-717, RESIMINE-730, RESIMINE-747 and RESIMINE-797 (SOLUTIA Co.); and, BE-3717, BE-370 and BE-3747 (BIP Co.). Further, the examples of methoxy/butoxy melamine resin in a mixed form include RESIMINE-755, RESIMINE-757 and RESIMINE-751 (SOLUTIA Co.); and, CYMEL-1168, CYMEL-1170 and CYMEL-232 (CYTEC Co.).

According to this invention, it is preferred to employ methoxy melamine resin or a mixed form of methoxy/butoxy melamine resin. However, in the event of using butoxy melamine resin independently or a simply mixed form of both methoxy melamine resin and butoxy melamine resin, their poor of compatibility with polyester resin may result in transferation of melamine to the upper part of paint, thus reducing the anti-contamination effect of the film of paint and lowering its gloss.

According to this invention, it is preferred that 5 to 50 wt. % of the melamine resin is contained to the total coating composition. If the content is less than 5 wt. %, anti-contamination and solvent resistance may be drastically reduced. In contrast, in case of exceeding 50 wt. %, the flexibility and impact resistance of a film of paint may be severely affected. Since the molecular weight of methoxy melamine resin or a mixed form of methoxy/butoxy melamine resin is lower than that of butoxy melamine resin, melamine may be easily melted at the surface of a film of paint and with the dissociation of tertiary amine therefrom, the self-condensation of melamine or their curing with resin layer is smoothly made available at the surface of a film of paint, thus obtaining the generally compacted film of paint.

According to this invention, the use of a curing accelerator may improve the crosslink density of a film of paint by accelerating the reaction of polyester resin and melamine resin. Hence, sulfonic acid blocked with a secondary amine or epoxy resin may be employed as a curing accelerator. The examples of sulfonic acid include p-toluene sulfonic acid, dodecylbezene disulfonic acid, dinonylnaphthalene disulfonic acid and dinonylnaphthalene sulfonic acid; among them, it is preferred to employ p-toluene sulfonic acid or dinonylnaphthalene sulfonic acid. It is preferred that sulfonic acid is blocked with a heat-dissociated material. The example of the blocking material include a secondary amine or an epoxy resin. Primary or tertiary amine may be employed instead of secondary amine but it is preferred to employ secondary amine, since primary amine may generate discoloration such as yellowing on a film of paint, while an excess of tertiary amine may shrink the surface of a film of paint. The examples of the secondary amine include diethylamine, diisopropylamine, diisopropanolamine, di-n-propylamine, di-ni-butylamine, di-secondary-butylamine, diarylamine, diamylamine, N-ethyl-1,2-diisobutylamine, dimethylpropylamine, N-methylhexylamine, di-ni-octylamine, piperidine, 2-pipecoline, 3-piecoline, 4-piecoline and morpholine. The appropriate amount of the activating material can significantly enhance the anti-contamination of a film of paint.

According to this invention, it is preferred that 0.5 to 2 wt. % of the curing accelerator is contained to the total coating composition. If the content is less than 0.5 wt. %, the appropriate anti-contamination effect cannot be maintained due to the insufficient curing of a film of paint. In contrast, in case of exceeding 2 wt. %, the radical curing may generate the popping at a film of paint or shrink the film of paint.

Meantime, to prevent some inorganic contaminants with a very high hardness contained in the film of paint, the high crosslink density of the film of paint is necessary. However, the extremely compacted film of paint may affect the flexibility, thus resulting in deteriorating the processibility which is most required in a pre-coated metal (PCM) process. To comply with this matter, the film of paint should be wholly flexible, while its surface only is compacted in the form of multi-layer structure.

According to this invention, a supplemental curing accelerator is employed so as to ensure more highly crosslinked film of paint with less use of a curing agent, thus improving the magic anti-contamination and preventing the metal mark generated from the collision among metals. If the surface of the film of paint is provided with excellent combination of property such as surface compactness by a supplemental curing accelerator and hydrophilic property by a surface modifier, then paint can be prepared in such a manner to simultaneously prevent organic/inorganic contaminants at a flexible film of paint.

Sulfonic acid blocked with tertiary amine is employed as a supplemental curing accelerator. Such acid serves to help the radical curing at the surface due to its high volatility, thus compacting the surface of the film of paint. Sulfonic acid is similar to the curing accelerator mentioned in the foregoing, and the examples of tertiary amine screening sulfonic acid include trimethylamine and triethylamine.

According to this invention, it is preferred that 0.001 to 3 wt. % of the supplemental curing accelerator is contained to the total coating composition. If the content is less than 0.001 wt. %, the curing promotion effect and metal mark resistance at the surface of the film of paint may be inhibited. In contrast, in case of exceeding 3 wt. %, the curing promotion effect may not be generated due to the shrinkage at the surface of the film of paint.

According to this invention, an isocyanate compound blocked with malonate is employed as a supplemental curing agent so as to prevent any curing at room temperature. Such supplemental curing agent, via urethane reaction with a resin, serves to prevent the formation of the film of paint with a very high chemical resistance and the infiltration of water into a material. The examples of isocyanate compound include isophorone diisocyanate (IPDI), toluene diisocyanate (TDI), hexamethylene diisocyanate (HMDI) and hexamethylene diisocyanate trimer. It is preferred that the isocyanate compound suitable for thermosetting type is selected from the compounds with no double bond, showing no yellowing. The examples of these compounds include Desmodure BL 375/BL1203 (Bayer Co. of Germany); and, R6711, R6730, R6720 and R6710 (KCC Co.). The concurrent use of acid curing agent with isocyanate compound of this invention may generate the severe yellowing to the film of paint. Therefore, it is preferred that isocyanate compound is blocked with malonates such as ethyl malonate.

According to this invention, it is preferred that 1 to 10 wt. % of the supplemental curing agent is contained to the total coating composition, preferably in the range of 3 to 7 wt %. If the content is less than 1 wt. %, the acid resistance of the film of paint may be deteriorated. In contrast, in case of exceeding 10 wt. %, the raw material cost of paint may be further increased.

According to this invention, a tin based catalyst is employed as a curing catalyst and the example of commercialized product include DBTDL Stan BL (Japanese catalyst product). Hence, it is preferred that 0.1 to 2 wt. % of the curing catalyst is contained to the total coating composition, preferably in the range of 0.5 to 1 wt %. If the content is less than 0.1 wt. %, the acid resistance of the film of paint may be deteriorated due to reduced catalytic function. In contrast, in case of exceeding 10 wt. %, the yellowing may occur with more increased raw material cost of paint.

According to this invention, alkyl silicate expressed by the formula 1 is employed as a surface modifier of the film of paint. The compound serves to provide hydrophilic groups to the surface of the film of paint with its self-cleaning effect of discharging some contaminants floated on water. Several prior arts have disclosed their anti-stain PCM coating compositions in which silicate compound containing the certain ratios of both silanol group (SiOH) and methoxysilyl group (SiOMe) as a surface modifier, but prior to the coating process, the reaction of silanol group with hydrophilic chemicals or water in the atmosphere may lead to the poor storage stability.

In contrast, since alkyl silicate of this invention (expressed by the formula 1) employed as a surface modifier of the film of paint contains no silanol group, the polyester based coating composition according to this invention has excellent chemical resistance and storage stability as well as the self-cleaning effect, since it is converted to hydrophilic material with hydroxy group lowering a water contact angle owing to water in the atmosphere and rainwater after the coating process. More specifically, a maximum amount of silicate is floated on the surface of the film of paint, thus blocking the infiltration pathway of water. Hence, it is preferred to select the silicate compound with the molecular weight of 4,000 to 10,000. If the molecular weight is less than 40,000, its high mixing reaction with resin may lower the surface floating effect of methoxylsilyl group and workability as well. In contrast, in case of exceeding 10,000, the degree of cure and other properties may be lowered due to the difficulty of crosslink reaction in the film of paint. In addition to that, the polyester based coating composition of this invention is industrially advantageous in that it can demonstrate other excellent properties of the film of paint such as appearance and workability even without the addition of any defoaming agent and leveling agent by adjusting the compatibility of both hydroxy unsaturated polyester resin and polyalkyl silicate. Since the surface tension of these additives has lower than that of silicate and non-reactive, they serve to prevent the surface floating of silicate.

By adjusting the molecular weight ratio of said hydroxy unsaturated polyester resin and polyalkyl silicate expressed by the formula 1 to 1:0.8 to 3.0, the polyester based coating composition of this invention can demonstrate excellent properties of a film of paint such as appearance and workability even without the addition of any defoaming agent and leveling agent. However, in the case of deviating the above range, a variety of compatibility related problems such as low workability/chemical resistance, paint coagulation and poor gloss.

According to this invention, it is preferred to select polyalkyl silicate (expressed by the formula 1) with the polymerization degree of 5 to 80, wherein alkyl groups are substituted into the main and branched chains of polyalkyl silicate. If the polymerization degree is less than 5, the surface modifying effect may be significantly reduced. In contrast, in case of exceeding 80, the storage stability and workability of paint may be deteriorated. The examples of alkyl group introduced into the main and branched chains include methyl or ethyl group. The examples of currently commercialized polyalkyl silicate include methyl silicate 51 (Colcoate Co.), ethyl silicate 40 (HULS Co.), methyl silicate 56, methyl silicate 56(S), methyl silicate 57 (Mitsubishi Chem.). According to this invention, it is preferred that 0.5 to 10 wt. % of the surface modifier is contained to the total coating composition. If the content is less than 0.5 wt. %, the self-cleaning effect of the film of paint may be significantly reduced. In contrast, in case of exceeding 10 wt. %, the storage stability of paint may be deteriorated with more increased raw material cost of paint.

The reaction rate among methoxy silyl groups is relatively stable in the absence of water but their radical reaction occurs in the presence of water or hydroxy group (—OH) of resin. Therefore, it should be designed to block hydroxy group of resin in the film of paint or minimize the contents of water. According to this invention, it is necessary to screen hydroxy group (—OH) contained in main resin and other components and to this end, alkoxy compound is contained as a storage stabilizer. According to this invention, it is preferred to select alkoxy compound with the mass average molecular weight of 100 to 1,000. If the mass average molecular weight is less than 100, the storage stability may be reduced. In contrast, in case of exceeding 1,000, its excessive amount may inhibit the curing of the film of paint. The examples of alkoxy compound according to this invention include KBM 13 (Shinetsu Co. of Japan), trimethyl orthoformate (HULS Co. of U.S.A.), triethyl orthoformate, trimethyl orthoacetate and ADDITIVE TI (Bayer Co. of Germany).

According to this invention, it is preferred that 1 to 5 wt. % of the storage stabilizer is contained to the total coating composition. If the content is less than 1 wt. %, the storage stability effect may be minimal. In contrast, in case of exceeding 5 wt. %, more highly crosslinked film of paint may not be ensured due to further increased raw material cost and curing inhibition.

Meantime, the polyester based coating composition of this invention may contain a transparent paint with no pigment, or may be employed to form the film of paint using organic or inorganic pigment. It is preferred to select the pigment which can provide the PCM paint with appropriate heat resistance and chemical resistance as a color pigment. Also, the basic particles of pigment should be fully considered. The examples of pigment include Cyanine Blue, titanium white, ferric oxide red, carbon black and chrome yellow. Further, the examples of extender pigment include Minusil, talc, clay and silica compound.

The examples of coating substrate according to this invention include cold rolled steel, zinc hot-dipping steel, electro-zinc steel, alloy-plate steel, copper sheet and tin-plate steel; among them, the main materials are cold rolled steel (CR), electro-zinc steel (EGI), zinc hot-dipping steel (GI) and alloy-plate steel (GA).

Further, the examples of pretreatment material include phosphate, chromate or its similar materials. The examples of primer include epoxy-type primer, polyester-type primer, acrylic-type primer or its modified primers; among them, it is most preferred to select epoxy-type primer.

The examples of the coating method according to this invention include curtain coating, roll coating, precipitation coating and spray coating. It is preferred that the film of paint has a thickness of 5 to 25 $\mu$m.

Further, the baking time can vary depending upon the baking conditions. It is most preferred to perform the baking process at 250 to 280 for 35 to 45 seconds under the PCM coating conditions.

This invention herein is explained in more detail based on the following examples without limitations thereby.

EXAMPLES 1 TO 16 AND COMPARATIVE EXAMPLES 1 to 6

The polyester based coating composition was formulated based upon the chemical contents represented by the following table 1a and 1b. The coating process was performed in the following conditions: a) primer coating process with a thickness of 5 to 7 $\mu$m using EJ2751-Y005 (Korea Chemicals), an epoxy-modified polyester primer, and b) baking at 280 for 22 seconds with wind velocity 2 m by controlling the highest temperature of material during the baking process to be 210 to 216. Hence, a #14 bar coating was employed. For the baking, an automatic discharge oven (Korea Taesung Engineering) was employed. A coating substrate was a galvanize iron plate of 0.45 mm, prepared by Korea Posco at Kwangyang Bay. The content of zinc on this plate was 87 mg/m$^2$. The pretreatment of galvanize iron was made by non rinse chromate (NRC; Korea Parkerizing Co.) with a coating amount of 20 to 40 mg/m$^2$.

Further, the chemical composition of the following table 1a and 1b was based upon the solid contents, except for the coating solvents. The coating solvents were used to adjust the flowing property and viscosity of the paint during production.

Manufacture of Mill/base (M/B)

1:1 mixture of cyclohexane (Kodac Co.)/Kocosol #100 (Yukong) was added to each polyester resin to make the solid content of 70%. Then, TiO$_2$ (Ishihara of Japan or DuPont) and 3 g of NUOSPERSE 657 as a dispersant (BYK Co.) were further added to each polyester resin in a 1 L tin container, followed by mixing a glass bead of 1 to 2 mm to the resulting solution. The mixture was dispersed for 90 minutes using a shake-type dispermat (RED DEVIL, Korea Chemical). The particle size of less than 5Am was achieved.

Manufacture of Let/down (L/D)

The following materials were added to the M/B, so prepared, to adjust the ratio of pigment and resin to 1.2/1: resin/curing agent/curing accelerator/supplemental curing accelerator/curing catalyst/surface modifier/storage stabilizer according to the following Tables 1a and 1b. The viscosity of the finally prepared coating material was adjusted to be 100 seconds/Ford Cup #4 at 25.

TABLE 1a

| Composition | Product | Example (g) | | | | | | | | Comp. Example (g) | | |
|---|---|---|---|---|---|---|---|---|---|---|---|---|
| | | 1 | 2 | 3 | 4 | 5 | 6 | 7 | 8 | 1 | 2 | 3 |
| Polyester resin | Lexorex C906-85[1] | 70 | 80 | | | 70 | | | | 85 | | |
| | Chempol 11-1645-A[2] | | | 50 | | | | | | | 70 | |
| | SN-830[3] | | | | 60 | | | | | | | 80 |
| | SN-805[4] | | | | | | 75 | 75 | 60 | | | |
| Melamine curing agent | cymel 303[8] | 30 | | | | | 25 | 25 | 40 | | | 20 |

TABLE 1a-continued

| Composition | Product | Example (g) 1 | 2 | 3 | 4 | 5 | 6 | 7 | 8 | Comp. Example (g) 1 | 2 | 3 |
|---|---|---|---|---|---|---|---|---|---|---|---|---|
| | cymel 325 | | 20 | | | | | | | | 30 | |
| | cymel 1168[9] | | | 50 | | 30 | | | | 15 | | |
| | cymel 370[10] | | | | 40 | | | | | | | |
| Curing accelerator | Nacure 1953[25] | 3 | | | 3 | 2 | | | 2.5 | 2.5 | | 1 |
| | Nacure 1419[26] | | 3 | 3 | | 1 | 2.5 | 3.5 | | | 3 | |
| Supplemental curing accelerator | Nacure 2107[27] | 0.1 | 0.1 | 0.1 | 0.1 | 0.1 | 0.1 | 0.1 | 0.1 | 0.1 | 0.1 | |
| Supplemental curing agent | R6711[21] | 5 | 5 | 5 | 5 | 5 | 5 | 5 | 5 | | | 5 |
| | R6730[22] | | | | | | | | | 5 | | |
| | BL3175[23] | | | | | | | | | | 5 | |
| Curing catalyst | DBTDL[30] | 0.1 | 0.1 | 0.1 | 0.1 | 0.1 | 0.1 | 0.1 | 0.1 | 0.1 | 0.1 | 0.1 |
| Surface modifier | MS-51[16] | 10 | | | | 10 | 20 | | | | 10 | |
| | MS-56[17] | | 10 | 10 | 12 | | | 10 | 12 | | | 5 |
| | ACZ42631[18] | | | | | | | | | 10 | | |
| Storage stabilizer | TEOF[31] | 2 | 3 | | | | | 3 | 3 | | | |
| | TMOA[32] | | | 2 | 2 | | | | | 2 | | |
| | KBM-13[33] | | | | | 3 | 3 | | | | | 3 |
| Levelling agent | Polyflow 90-50[35] | | | | | | | | | | 1 | |
| | Dispalon L1980[36] | | | | | | | | | 1 | | 1 |
| Pigment | TiO$_2$ | 125 | 125 | 125 | 125 | 125 | 125 | 125 | 125 | 125 | 125 | 125 |

TABLE 1b

| Composition | Product | Example (g) 9 | 10 | 11 | 12 | 13 | 14 | 15 | 16 | Comp. Example (g) 4 | 5 | 6 |
|---|---|---|---|---|---|---|---|---|---|---|---|---|
| Polyester resin | Lexorex C906-85[1] | 70 | | | | 70 | | | | | | |
| | CRF0003[5] | | 80 | 70 | | | 60 | | | 85 | | |
| | SK A960[6] | | | | 60 | | | 75 | 60 | | | 80 |
| | R3310[7] | | | | | | | | | | 70 | |
| Melamine curing agent | Resimine 747[12] | 30 | 20 | | 40 | | 40 | | 40 | 15 | | |
| | Resimine 7512[13] | | | | | | | | | | 30 | |
| | Resimine 797[14] | | | 30 | | 30 | | 25 | | | | |
| | Beetle BE630[15] | | | | | | | | | | | 30 |
| Curing accelerator | Nacure 1953[25] | | | 3 | 3 | 2 | | | 3 | 1.5 | | 2 |
| | Nacure XP-383[28] | 3 | 3 | | | 1 | | 3 | | | 3 | |
| Supplemental curing accelerator | Taycacure AC3401[29] | | 0.2 | | 0.2 | | 0.2 | | 0.2 | | 0.2 | |
| | Nacure 2107[27] | 0.1 | | 0.1 | | 0.1 | | 0.1 | | 0.1 | | 0.1 |
| Supplemental curing agent | R6711[21] | 5 | 5 | 5 | 5 | 5 | 5 | 5 | 5 | | | 5 |
| | B-1370[24] | | | | | | | | | | | |
| | BL3175[23] | | | | | | | | | | 5 | |

TABLE 1b-continued

|  |  | Example (g) | | | | | | | | Comp. Example (g) | | |
| --- | --- | --- | --- | --- | --- | --- | --- | --- | --- | --- | --- | --- |
| Composition | Product | 9 | 10 | 11 | 12 | 13 | 14 | 15 | 16 | 4 | 5 | 6 |
| Curing catalyst | DBTDL[30] | 0.1 | 0.1 | 0.1 | 0.1 | 0.1 | 0.1 | 0.1 | 0.1 | 0.1 | 0.1 | 0.1 |
| Surface modifier | MS-56(S)[19] | 10 |  |  |  | 10 | 20 |  |  |  |  |  |
|  | MS-57[20] |  | 10 | 10 | 12 |  |  | 10 | 12 | 10 |  | 5 |
|  | ACZ42631[18] |  |  |  |  |  |  |  |  |  | 10 |  |
| Storage stabilizer | KBM-13[33] | 3 |  |  |  |  |  |  | 3 | 3 |  |  |
|  | TEOF[31] |  | 3 | 3 |  |  | 3 | 3 |  |  | 3 |  |
|  | ADDITIVE TI[34] |  |  |  | 2 | 2 |  |  |  |  |  | 3 |
| Levelling agent | Polyfolw 90-50[35] |  |  |  |  |  |  |  |  | 1 |  | 1 |
|  | Dispalon L1980[36] |  |  |  |  |  |  |  |  |  | 1 |  |
| Pigment | TiO$_2$ | 125 | 125 | 125 | 125 | 125 | 125 | 125 | 125 | 125 | 125 | 125 |

Note:
[1])Leolex C906-85: Manufacturer (Inolex Co.), Tg (−10), OH value (90), number average molecular weight (1500)
[2])CHEMPOL 11-1645-A: Manufacturer (CCP Co.), Tg (−5), OH value (60), number average molecular weight (4500)
[3])SN-830: Manufacturer (DSM Co.), Tg (32), OH value (40), number average molecular weight (4500)
[4])SN-805: Manufacturer (DSM Co.), Tg (0), OH value (85), number average molecular weight (3000)
[5])CRF00031: Manufacturer (KCC Co.), Tg (38), OH value (55), number average molecular weight (4000)
[6])SK A960: Manufacturer (SK Chem.), Tg (20), OH value (20), number average molecular weight (8000)
[7])R3310: Manufacturer (KCC Co.), Tg (35), OH value (60), number average molecular weight (3500)
[8])CYMEL 303: Manufacturer (CYTEC Co.), a melamine resin (full methoxy melamine type) with the molecular weight of less than 1000 and solid content of 98%
[9])CYMEL 325: Manufacturer (CYTEC Co.), a methoxy melamine resin (high imino type) with the solid content of 80%
[10])CYMEL 1168: Manufacturer (CYTEC Co.), a melamine resin (a mixed type of methoxy-butoxy group) with the solid content of 80%
[11])CYMEL 370: Manufacturer (CYTEC Co.), a melamine resin (a mixed type of methoxymethyl-methyol group) with the solid content of 88%
[12])RESMINE 747: Manufacturer (SOLUTIA Co.), a melamine resin (full methoxy melamine type) with the molecular weight of less than 1000 and solid content of 98%
[13])RESMINE 7512: Manufacturer (SOLUTIA Co.), a melamine resin (full methoxy melamine type) with the solid content of 98%
[14])RESMINE 797: Manufacturer (SOLUTIA Co.), a melamine resin modified by 20% styrene arylalchol with a very high reactivity; a modified methoxy melamine resin (SOLUTIA Co.)
[15])BEETLE BE630: Manufacturer (BEETLE Co.), a melamine resin (full methoxy melamine type) with the solid content of 98%
[16])MS-51: Manufacturer (Colcoate Co. or Mitsubishi Chemical of Japan), methylsilicate (expressed by the formula 1) with the polymerization degree of 5 to 10
[17])MS-56: Manufacturer (Mitsubishi Chemical of Japan), methylsilicate (expressed by the formula 1) with the polymerization degree of 10 to 20
[18])ACZ42631: Manufacturer (Kumgang Korea Chemical), ethylsilicate/ethylsilane (SiOH) with the polymerization degree of 20 to 30
[19])MS-56(S): Manufacturer (Mitsubishi Chemical of Japan), methylsilicate (expressed by the formula 1) with the polymerization degree of 30 to 40
[20])MS-57: Manufacturer (Mitsubishi Chemical of Japan), methylsilicate (expressed by the formula 1) with the polymerization degree of 20 to 30
[21])Manufacturer (Kumgang Korea Chemical), isophorone diisocyanate (IPDI) blocked by ethylmalonate
[22])Manufacturer (Kumgang Korea Chemical), hexamethylene diisocyanate (HMDI) trimer blocked by methylmalonate
[23])Manufacturer (Bayer Co. of Germany), hexamethylene diisocyanate (HMDI) trimer blocked by methylethyl ketone
[24])Manufacturer (HULS Co. of U.S.A.), isophorone diisocyanate (IPDI) blocked by methylethyl ketone
[25])Nacure 1953: Dinonylsulfonic acid blocked with secondary amine (dissociation temperature: more than 140)
[26])Nacure 1419: Manufacturer (KING Co.), dinonylsulfonic acid blocked with epoxy resin (dissociation temperature: more than 160)
[27])Nacure 2107: Manufacturer (KING Co.), p-toluenesulfonic acid blocked with tertiary amine (dissociation temperature: more than 115)
[28])Nacure XP-383: Manufacturer (KING Co.), dinonylsulfonic acid blocked with epoxy resin (dissociation temperature: more than 120)
[29])Taycacure AC3401: Manufacturer (Tayca Co. of Japan), dodecylbenzene sulfonic acid blocked with tertiary amine (dissociation temperature: more than 140)
[30])DBTDL: Manufacturer (Songwon Ind. of Korea), tin based catalyst
[31])TEOF: Manufacturer (HULS Co. of U.S.A.), triethylorthoformate
[32])TMOA: Manufacturer (HULS Co. of U.S.A.), triethylorthoacetate
[33])KBM-13: Manufacturer (Shinetsu Co. of Japan.), methyltrimethoxy silane
[34])ADDITIVE TI: Manufacturer (Bayer Co. of Germany), 4-toluenesulfonyl isocyanate
[35])Polyflow No. 90-50: Manufacturer (Gousha Co. of Japan), acrylic leveling agent
[36])Dispalon L-1980: Manufacturer (Gusumoto Co. of Japan), acrylic leveling agent

Experimental Example

Physical Property Test

Each coating composition, so prepared from Examples 1 to 16 and Comparative examples 1 to 6, was applied by a bar coater (bar #26) and through the baking process at 280 for 30 seconds in an automatic discharge oven, a film of paint was prepared. The results were shown in the following tables 2a and 2b.

[Experimental Method]

1. Gloss (60°): The 60° gloss for the film of paint was measured using a gloss machine (BYK Co. or SHEEN Co.)
2. Hardness: The scratch for the film of paint was evaluated using Uni pencil (Mitsubishi of Japan).
3. Magic contamination: After the film of paint contaminated with a red magic (Monami Co.) was left for 1 hour, its surface was washed with methanol and measure color difference(E) of remaining trace and discontaminated site.
4. Flexibility: Two different sheets having the same thickness as the film of fim was placed at room temperature and bended up to 180, Scotch tape test was used to evaluate crack.
   [Evaluation score: no crack (5)←, →full detachment owing to the occurrence of crack (1)]
5. Acid resistance: After the film of paint was stained with 5% HCl solution, its adjacent surface was covered and sealed with vaseline and stood at 25 for 24 hours to evaluate the acid resistance.
   [Evaluation score: no trace (5)←, →full detachment owing to the occurrence of crack (1)]
6. Alkali resistance: After the film of paint was stained with 5% sodium hydroxide solution, its adjacent surface was covered and sealed with vaseline and stood at 25 for 24 hours to evaluate the alkali resistance.
   [Evaluation score: no trace (5)←, →full detachment owing to the occurrence of crack (1)]
7. Carbon contamination: The film of paint was sprayed by 10% carbon black solution in water and stood at 80 for 24 hours. The specimen was cooled off and washed with a soft brush in flowing water to record the results of color difference (E).
8. Q.U.V gloss retention (%) for 500 hours: UV wavelength was controlled by B type (313 nm) using Q.U.V -se (Q-PANEL Co. of U.S.A.) and then, the cycle was radiated at 60 for 8 hours and condensed at 40 for 4 hours to compare the gloss retention after Q.U.V test with the initial gloss test of the film of paint.
9. Storage stability: After measuring the initial viscosity, paint was stood in oven at 60 for 7 days to evaluate the changes in the viscosity of stored paint and in the hardness of the film of paint.
10. Outdoor exposure anti-contamination test: The film of paint was bended by the angle of 45° and exposed to the outdoor to evaluate the anti-contamination (E).

TABLE 2a

| Item | Example (g) | | | | | | | | Comp. Example (g) | | |
|---|---|---|---|---|---|---|---|---|---|---|---|
| | 1 | 2 | 3 | 4 | 5 | 6 | 7 | 8 | 1 | 2 | 3 |
| Gloss (60°) | 94 | 95 | 86 | 97 | 94 | 90 | 92 | 93 | 91 | 86 | 96 |
| Hardness (Mit-Uni pensil) | 2H | 2H | H | H | 2H | H | 2H | 2H | H | H | H |
| Magic contamination E (Monami Co.) | 0.5 | 0.8 | 1.3 | 1.2 | 0.5 | 1.0 | 0.6 | 0.3 | 0.3 | 0.5 | 4.6 |
| Processibility (2T, taping) | 4 | 4 | 5 | 4 | 4 | 4 | 4 | 4 | 4 | 4 | 4 |
| 5% HCl, 24 hrs | 5 | 5 | 5 | 5 | 5 | 5 | 5 | 5 | 4 | 4 | 4 |
| 5% NaOH, 24 hrs | 5 | 5 | 5 | 5 | 5 | 5 | 5 | 5 | 4 | 4 | 4 |
| Carbon contamination E | 0.3 | 9.5 | 1.1 | 1.0 | 0.4 | 1.0 | 0.5 | 0.3 | 3.8 | 3.8 | 3.0 |
| 4.6 | 44 | 35 | 40 | 45 | 40 | 45 | 45 | 40 | 45 | 40 | 35 |
| Storage stability | ○ | | | | ○ | ○ | | | X | X | ○ |
| Outdoor exposure anti-contamination (E) | 1.7 | 0.5 | 1.9 | 1.0 | 1.6 | 1.2 | 1.5 | 1.4 | 7,8 | 3.2 | 0.9 |

TABLE 2b

| Item | Example (g) | | | | | | | | Comp. Example (g) | | |
|---|---|---|---|---|---|---|---|---|---|---|---|
| | 9 | 10 | 11 | 12 | 13 | 14 | 15 | 16 | 4 | 5 | 6 |
| Gloss (60°) | 94 | 84 | 85 | 86 | 94 | 90 | 92 | 93 | 91 | 45 | 40 |
| Hardness (Mit-Uni pensil) | 2H | H | H | F | 2H | H | 2H | 2H | F | H | HB |
| Magic contamination E (Monami Co.) | 0.4 | 0.7 | 0.5 | 1.2 | 0.5 | 1.0 | 0.4 | 0.2 | 0.8 | 3.8 | 2.0 |
| Processibility (2T, taping) | 4 | 5 | 5 | 5 | 4 | 4 | 4 | 3 | 5 | 5 | 5 |
| 5% HCl, 24 hrs | 5 | 5 | 5 | 5 | 5 | 4 | 5 | 5 | 2 | 4 | 4 |
| 5% NaOH, 24 hrs | 5 | 5 | 5 | 5 | 55 | 5 | 5 | 5 | 3 | 4 | 4 |

TABLE 2b-continued

| Item | Example (g) | | | | | | | | Comp. Example (g) | | |
|---|---|---|---|---|---|---|---|---|---|---|---|
| | 9 | 10 | 11 | 12 | 13 | 14 | 15 | 16 | 4 | 5 | 6 |
| Carbon contamination E | 0.3 | 0.5 | 1,2 | 1.3 | 0.4 | 1.0 | 0.3 | 0.1 | 4.0 | 3.5 | 4.6 |
| Q.U. V gloss rate (%), 500 hrs | 43 | 95 | 95 | 20 | 44 | 45 | 47 | 45 | 25 | 26 | 28 |
| Storage stability | | | | ○ | ○ | | | | ○ | X | |
| Outdoor exposure anti-contamination (E) | 0.3 | 0.5 | 1.5 | 0.5 | 0.5 | 0.1 | 1.5 | 1.4 | 7.8 | 5.5 | 9.9 |

As described above, the polyester based coating composition for anti-stain PCM outside panel according to this invention can be effectively used in coating an architectural PCM outside panel with the excellent combination of properties such as anti-contamination, acid resistance, weatherability and self-washing property, wherein it comprises: the high-weather-resistance polyester based coating composition containing a hydroxy unsaturated polyester resin using benzene-free acid monomer and a melamine curing agent as main ingredients, comprises the certain chemical composition ratio of a) sulfonic acid blocked with a secondary amine or epoxy resin, b) sulfonic acid blocked with a tertiary amine, c) an isocyanate compound blocked with malonate, d) a tin based curing catalyst, e) polyalkyl silicate, and f) an alkoxy compound. In particular, the polyester based coating composition for anti-strain PCM outside panel can demonstrate excellent properties such as appearance and workability for a film of paint even without the addition of any defoaming agent and leveling agent by maintaining the appropriate scope of molecular weight of both hydroxy unsaturated polyester resin as a main resin and polyalkyl silicate as a surface modifier.

What is claimed is:

1. A polyester based coating composition for anti-stain PCM outside panel consisting of a hydroxy unsaturated polyester resin, a melamine curing agent, a curing accelerator, a supplemental curing agent, a supplemental curing accelerator, a storage stabilizer and a curing catalyst, wherein said polyester based coating composition further comprises:

a) 40 to 80 wt. % of the hydroxy unsaturated polyester resin;
   b) 5 to 50 wt. % of the melamine curing agent;
   c) 0.5 to 3 wt. % of sulfonic acid blocked with a secondary amine or epoxy resin;
   d) 0.001 to 3 wt. % of sulfonic acid blocked with a tertiary amine;
   e) 1 to 10 wt. % of an isocyanate compound blocked with malonate;
   f) 0.1 to 2 wt. % of a tin based curing catalyst;
   g) 0.5 to 10 wt. % of polyalkyl silicate expressed by the following formula; and
   h) 1 to 5 wt. % of an alkoxy compound:

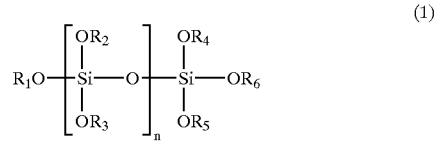

(1)

wherein $R_1$, $R_2$, $R_3$, $R_4$, $R_5$ and $R_6$ are independently lower alkyl groups of $C_{1-5}$; and n is an integer of 5 to 80.

2. The polyester based coating composition for anti-stain PCM outside panel according to claim 1, wherein said hydroxy unsaturated polyester resin is characterized by having a number average molecular weight (Mn) of 800 to 15,000, the glass transition temperature (Tg) of −15 to 60 and OH value of 15 to 180.

3. The polyester based coating composition for anti-stain PCM outside panel according to claim 1, wherein said melamine curing agent is a methoxy melamine resin or a mixed form of methoxy/butoxy melamine resin.

4. The polyester based coating composition for anti-stain PCM outside panel according to claim 1, wherein said isocyanate compound blocked with malonate is selected from the following compounds blocked with ethylmalonate: isophorone diisocyanate (IPDI), toluene diisocyanate (TDI), hexamethylene diisocyanate (HMDI) or hexamethylene diisocyanate trimer.

5. The polyester based coating composition for anti-stain PCM outside panel according to claim 1, wherein said hydroxy unsaturated polyester resin has a number average molecular weight (Mn) of 800 to 15,000, while the addition of any leveling agent or defoaming agent is unnecessary by adjusting the molecular weight of polyalkyl silicate to 5,000 to 10,000.

6. The polyester based coating composition for anti-stain PCM outside panel according to claim 1, wherein by adjusting a molecular weight ratio of said hydroxy unsaturated polyester resin and polyalkyl silicate by expressed the formula 1 to 1:0.8 to 3.0, the addition of any leveling agent or defoaming agent is unnecessary.

7. A steel plate coated by the coating composition according to claim 1.

* * * * *